(12) United States Patent
Ishiguro

(10) Patent No.: US 8,379,675 B2
(45) Date of Patent: Feb. 19, 2013

(54) JITTER BUFFERING CONTROL FOR CONTROLLING STORAGE LOCATIONS OF A JITTER BUFFER, AND A METHOD THEREFOR

(75) Inventor: Takashi Ishiguro, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 322 days.

(21) Appl. No.: 12/659,470

(22) Filed: Mar. 10, 2010

(65) Prior Publication Data

US 2010/0246608 A1    Sep. 30, 2010

(30) Foreign Application Priority Data

Mar. 25, 2009   (JP) ................................. 2009-073770

(51) Int. Cl.
*H04J 3/16* (2006.01)
(52) U.S. Cl. ........ 370/516; 370/252; 370/230; 370/392; 375/372; 375/371; 710/52; 710/29; 710/18
(58) Field of Classification Search .................. 370/516, 370/252, 230, 235, 392, 412, 517; 375/372, 375/371; 710/52, 29, 57, 18; 711/744, 111
See application file for complete search history.

(56) References Cited

U.S. PATENT DOCUMENTS

| | | | | |
|---|---|---|---|---|
| 6,631,429 B2 * | 10/2003 | Cota-Robles et al. | ........... | 710/52 |
| 6,775,301 B1 * | 8/2004 | Kroll et al. | ..................... | 370/516 |
| 6,977,897 B1 * | 12/2005 | Nelson et al. | ................. | 370/235 |
| 7,161,978 B2 * | 1/2007 | Lu et al. | ......................... | 375/219 |

OTHER PUBLICATIONS

"Guideline for VoIP-TA/Facsimile Terminals for Connecting a Facsimile Terminal to an IP-PBX through a VoIP-TA" Communications and Information Network Association of Japan, CES-Q006-1, Oct. 19, 2007.

* cited by examiner

*Primary Examiner* — Michael Thier
*Assistant Examiner* — Jamal Javaid
(74) *Attorney, Agent, or Firm* — Rabin & Berdo, P.C.

(57) ABSTRACT

A jitter buffer control apparatus has a buffer for storing data included in an input packet transmitted from a telecommunications network, and a jitter buffer controller for controlling the buffer to store the input data into the buffer and take out the stored data from the buffer on the basis of a sequence number included in the input packet in a processing period. When under-running occurs in the buffer, the jitter buffer controller stores input data into the buffer with a storage location skipped which corresponds to the processing period associated with packet loss due to the under-running.

5 Claims, 10 Drawing Sheets

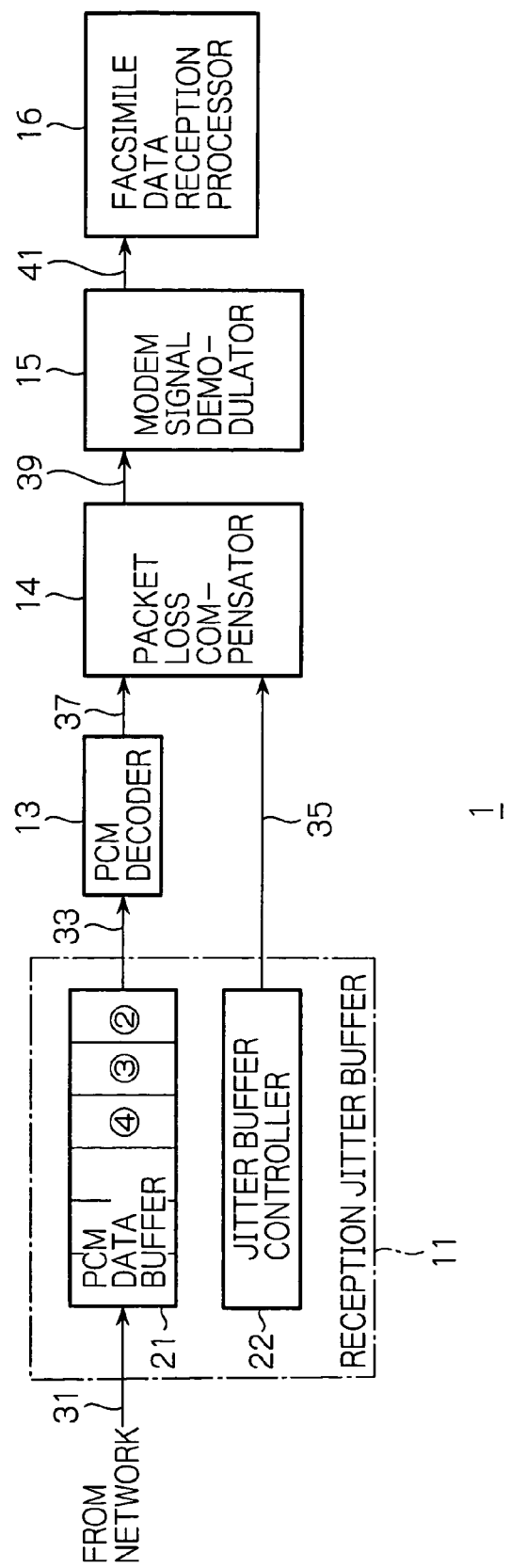

FIG. 2

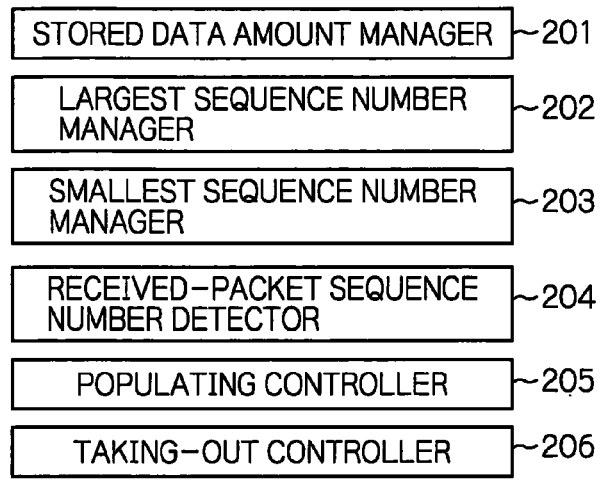

| | |
|---|---|
| STORED DATA AMOUNT MANAGER | ~201 |
| LARGEST SEQUENCE NUMBER MANAGER | ~202 |
| SMALLEST SEQUENCE NUMBER MANAGER | ~203 |
| RECEIVED-PACKET SEQUENCE NUMBER DETECTOR | ~204 |
| POPULATING CONTROLLER | ~205 |
| TAKING-OUT CONTROLLER | ~206 |

| VARIABLES | DESCRIPTION |
|---|---|
| empty | FLAG INDICATING THE STATE OF PCM DATA BUFFER (CORRESPONDING TO, E.G. 10ms) 0: DATA STORED/1: EMPTY |
| sn | SEQUENCE NUMBER IN PCM DATA BUFFER |
| sn_sub | SEQUENCE NUMBER IN PCM DATA BUFFER (SUB-NUMBER) FOR USE IN, E.G. IP PACKET HAVING PCM PAYLOAD SIZE OF 20ms & PCM DATA BUFFER BASED ON THE UNIT OF 10ms |
| sn_RTP | SEQUENCE NUMBER OF RECEIVED PACKET |
| sn_biggest | LARGEST SEQUENCE NUMBER IN JITTER BUFFER |
| sn_smallest | SMALLEST SEQUENCE NUMBER IN JITTER BUFFER (NEXT DATA TO BE DECODED) |

JITTER BUFFERING CONTROL FOR CONTROLLING STORAGE LOCATIONS OF A JITTER BUFFER, AND A METHOD THEREFOR

BACKGROUND OF THE INVENTION

1. Field of the Invention

The present invention relates to an apparatus and a method for controlling jitter buffering, and more particularly to such an apparatus and a method applicable to, for example, a telecommunications apparatus connected to an IP (Internet Protocol) network.

2. Description of the Background Art

A telecommunications apparatus transmitting and receiving PCM (Pulse Code Modulation) signals such audio or facsimile signals over an IP network needs to control reception jitter buffering in order to absorb or compensate for fluctuation, or jitter, involved in IP packets.

In a conventional solution for controlling reception jitter buffering, a buffer circuit receives and stores PCM data and additional information, carried on an IP packet asynchronously arriving from an IP network, in the order of the sequence number contained in the header of the IP packet, and outputs the PCM data at a predetermined processing interval, e.g. 10 millisecond (ms), in the order of the sequence number.

Between a transmitter and a receiver side dealing with communications on an IP network, it is difficult to perfectly synchronize the basic periods, e.g. 10 ms, of the respective system clocks with each other. Between both sides, a difference in precision could be caused so that the reception jitter buffer may involve under-running, which may cause appropriate PCM data to lack Additionally, when packet loss occurs in an IP network, the sequence number of received packets skips so as to cause some PCM data not to exist in the reception jitter buffer.

In such cases, in order to avoid discontinuity of the linear signals, the received-signal processor in a conventional solution uses a signal inputted in the past to generate a pseudo linear signal, with which a signal is compensated for, or interpolated, to demodulate digital data and control signals.

However, for example, in facsimile communications over an IP network, in order to demodulate a control signal compensated for, or interpolated, with a pseudo linear signal, a signal in the past is used to generate the pseudo linear signal, resulting in the control signal being incorrectly demodulated, which may cause a communication error.

In order to solve such a problem, a solution is used which is disclosed in a publication "Guideline for VoIP-TA/Facsimile Terminals for connecting a Facsimile Terminal to an IP-PBX through a VoIP-TA", Communications and Information Network Association of Japan, CES-Q006-1, Oct. 19, 2007. This guideline describes a technique related to facsimile communications over an IP network.

In a solution for controlling jitter buffering shown in FIG. 3.10 of the guideline, in order to prevent a modem signal reception error from being caused by under-running in a reception jitter buffer, the reception jitter buffer stores, at the beginning of facsimile communication, a predetermined volume of data, for example, corresponding to 140 ms, prior to starting to output the data therefrom. Thus, the storage of a predetermined volume of data prior to commencing the output of the data from the reception jitter buffer can prevent the reception jitter buffer from being depleted of data, thereby avoiding under-running.

When packet loss compensation means generates, as described above, a pseudo linear signal on the basis of a past input signal in response to an occurrence of under-running to insert the pseudo linear signal, a modem signal is subject to temporal extension to thereby disarrange its phase, thus the disarrangement continuing even after the period of packet loss. Thereby, the modem signal cannot correctly be demodulated, which may cause a reception error.

When a large difference in processing period is caused between the transmitter and receiver sides, or a large fluctuation is caused through the IP network, the possibility in occurrence of the under-running increases.

Even when the technique described in the above-described guideline is applied, the following problems could occur. For example, when a large precision difference in basic period (for example, 10 ms) of the system clocks is caused between the transmitter and receiver sides, or a large fluctuation is caused through the IP network, or facsimile communication continues over a long period of time, the reception jitter buffer may completely be depleted of a certain volume of data stored therein. Thus, the under-running of the reception jitter buffer cannot completely be eliminated, which is problematic.

Additionally, by increasing the storage capacity of the reception jitter buffer capable of storing data, the occurrence of the under-running in the reception jitter buffer can be reduced. However, a transmission delay in the reception jitter buffer increases, which is problematic.

For example, a protocol for facsimile communications provides a response monitoring period in which it is monitored whether or not a response to the control signal transmitted is received from a transmitter side. Therefore, if no response signal is received within the response monitoring period, the facsimile communication is determined as failure.

Furthermore, when the reception jitter buffer stores a small volume of data stored at the start of facsimile communication over an IP network, a large precision difference in basic period, e.g. 10 ms, of the system clocks between the transmitter and receiver sides, a large fluctuation caused through the IP network, or a long duration of facsimile communication may cause the reception jitter buffer to store a larger amount of data, thereby causing a longer delay in output data as time elapsing. In this case, the transmission delay may increase to result in failure of the facsimile communication, which is also problematic.

The above-described problems can be raised in not only facsimile communications but also audio communications over an IP network.

SUMMARY OF THE INVENTION

It is therefore an object of the present invention to provide an apparatus and a method for controlling jitter buffering capable of preventing a communication error caused by under-running in a reception jitter buffer when a precision difference in basic periods of clock signals is large between a transmitter and a receiver side, a large fluctuation is caused over an IP network, for example.

In accordance with the present invention, a jitter buffer control apparatus comprises a buffer having a plurality of storage locations for storing input data included in an input packet received from a telecommunications network, the input packet having a sequence number allotted thereto, and a jitter buffer controller for controlling the buffer at a processing time interval defining a predetermined length of processing period to store the input data into the buffer and take out the stored input data from the buffer on the basis of the sequence number. The jitter buffer controller is responsive to under-running being caused in the buffer to store the input data into the buffer with at least one of the storage locations skipped which corresponds to the processing period associated with packet loss occurring due to the under-running.

In accordance with one aspect of the invention, in a method for controlling jitter buffering in a jitter buffer control apparatus including a buffer having a plurality of storage locations for storing input data included in an input packet received from a telecommunications network, the input packet having a sequence number allotted thereto, a jitter buffer controller controls the buffer at a processing time interval defining a predetermined length of processing period to store the input data into the buffer and take out the stored input data from the buffer on the basis of the sequence number. In the method, the jitter buffer controller is responsive to under-running being caused in the buffer to store the input data into said buffer with at least one of the storage locations skipped which corresponds to the processing period associated with packet loss occurring due to the under-running.

In accordance with another aspect of the invention, a program for use in a jitter buffer control apparatus including a buffer having a plurality of storage locations for storing input data included in an input packet received from a telecommunications network, the input packet having a sequence number allotted thereto, causes, when installed and running on a computer, the computer to function as the jitter buffer controller described above.

In accordance with still another aspect of the invention, an information processing system comprises the jitter buffer control apparatus described above.

In accordance with the present invention, even when a large precision difference in basic period of a system clock between a transmitter and a receiver side, or fluctuation caused over an IP network, for example, causes under-running in a jitter buffer on the receiver side, a communication error can be minimized.

BRIEF DESCRIPTION OF THE DRAWINGS

The objects and features of the present invention will become more apparent from consideration of the following detailed description taken in conjunction with the accompanying drawings in which:

FIG. 1 schematically shows the internal configuration of a facsimile communication apparatus in accordance with an illustrative embodiment of the present invention;

FIG. 2 schematically shows the functional blocks of jitter buffering control in the jitter buffer controller included in the illustrative embodiment shown in FIG. 1;

FIG. 3 lists variables for use in the description of the jitter buffer control in the illustrative embodiment;

DESCRIPTION OF THE PREFERRED EMBODIMENT

Figure 4:
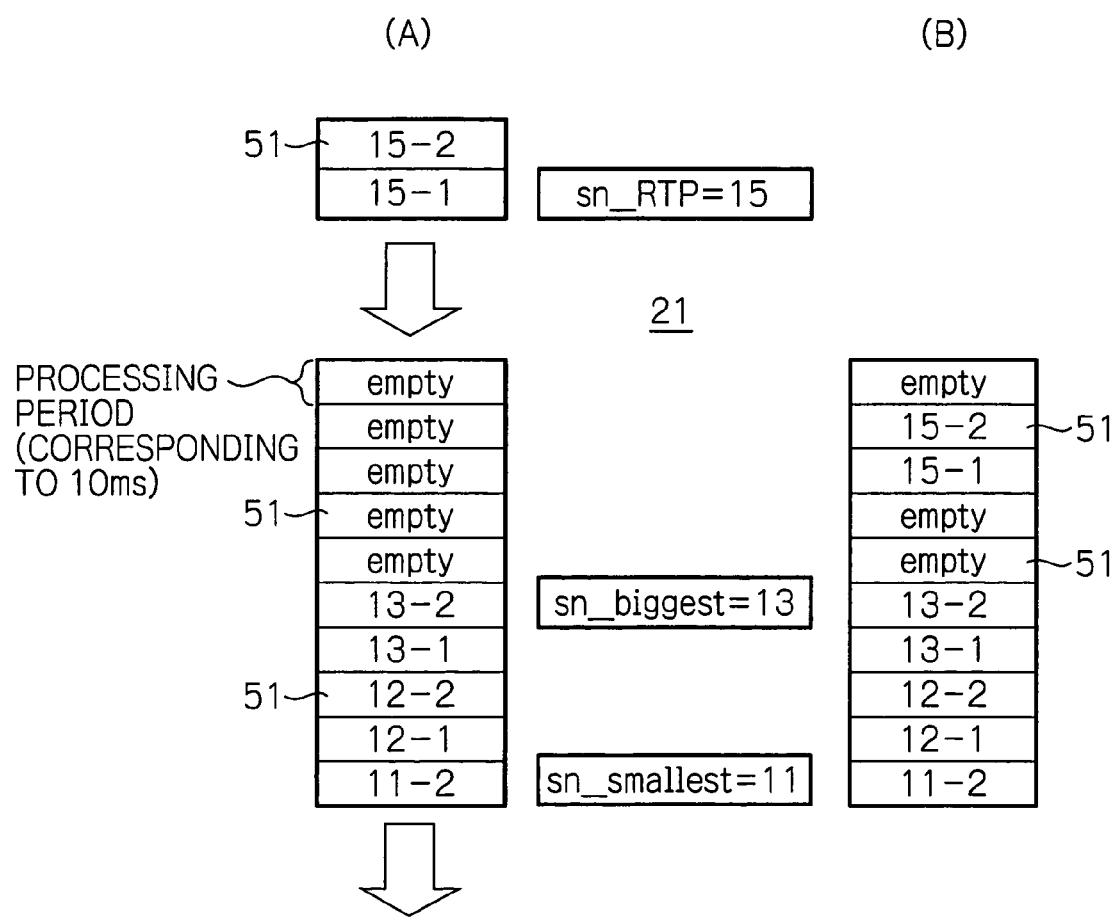
FIG. 4 is a schematic diagram useful for understanding the jitter buffering control in accordance with the embodiment.

An apparatus for controlling jitter buffering exemplarily applied to an information processing system in accordance with an illustrative embodiment of the present invention will be described below with reference to the accompanying drawings. In an illustrative embodiment, the present invention is applied to reception jitter buffering control in a facsimile communication apparatus, by way of example, communicable over a telecommunications network such as an IP (Internet Protocol) network and standardized under ITU-T (International Telecommunication Union Telecommunication Standardization Sector) Recommendation, T. 30. However, such an applicable standard is not restrictive but generally to any other appropriate standards.

FIG. 1 schematically shows the internal configuration of a facsimile communication apparatus 1 in accordance with the illustrative embodiment exemplarily applied to an apparatus having a facsimile communication function established on an information processing system such as a personal computer (PC) or a server.

As seen from FIG. 1, the facsimile communication apparatus 1 includes at least a reception jitter buffer 11, a PCM (Pulse Code Modulation) decoder 13, a packet loss compensator 14, a modem signal demodulator 15, and a facsimile data reception processor 16, which are interconnected as illustrated.

The reception jitter buffer 11 includes a PCM data storage buffer 21, and is adapted to receive an IP packet asynchronously arriving from an IP network, now shown, on its input port 31 and to take out, or extract, from the IP packet received PCM data and a sequence number allotted to that packet to store the PCM data in the data buffer 21 in the order of the sequence number and output the PCM data from the PCM data buffer 21 in the order of the sequence number on its output port 33. The reception jitter buffer 11 sends the PCM data outputted from the data buffer 21 to the PCM decoder 13.

The reception jitter buffer 11 is so adapted to prevent, when under-running is caused therein, the signal processing subsequent to the reception jitter buffer 11 during the processing period, described later, in which the under-running has been caused. In other words, the reception jitter buffer 11 stops outputting the PCM data during that processing period in which the under-running is caused. In the description, signals and data are designated with reference numerals of connections on which they are conveyed.

The illustrative embodiment is thus adapted to prevent the PCM data stored from being outputted during a processing period in which under-running is caused to thereby disable a modem signal from being decoded in the following process, thereby attaining normal demodulation to continue.

The reception jitter buffer 11 includes, as shown in FIG. 1, a jitter buffer controller 22 in addition to the data buffer 21. As briefly described above, the data buffer 21 stores PCM data included in an IP packet inputted from the IP network. Under the control of the jitter buffer controller 22, the reception jitter buffer 11 is operative at each processing time interval to store in and take out PCM data to and from the data buffer 22. In the instant embodiment, the unit processing time interval, which defines a predetermined length of processing period, in time with which PCM data are stored into the data buffer 21 is set to a value corresponding to the period of incoming PCM data 31, for example, 10 ms. However, it is not restrictive. Additionally, the size, or capacity, of jitter buffering of the data buffer 21 is not restricted to a specific value.

The jitter buffer controller 22 serves as controlling the process for populating, or storing, PCM data into the data buffer 21 and taking out, or developing, the PCM data from the data buffer 21. The jitter buffer controller 22 controls taking out PCM data from the data buffer 21 in time with a predetermined length of processing period.

The jitter buffer controller 22 is adapted to stop outputting PCM data from the storage buffer 21 during the processing period in which under-running is caused.

The jitter buffer controller 22 manages the volume of PCM data stored in the data buffer 21, and the smallest and largest sequence numbers stored in the storage buffer 21, so that the volume of the PCM data stored and the smallest and largest sequence numbers are referenced to populate data into and taking out the data from the data buffer 21.

When taking out the PCM data from the data buffer 21, the jitter buffer controller 22 is responsive to whether or not packet loss occurs to supply the packet loss compensator with a signal representative of the occurrence or nonoccurrence of packet loss, respectively, on its output port 35.

FIG. 2 schematically shows in a functional block diagram the functions for jitter buffering control accomplished by the jitter buffer controller 22. The jitter buffering controller 22 can be implemented by software, namely, by a computer, or processor system, which has a computer program installed and functions, when executing the computer program, as part of, or the entirety of, the jitter buffer controller 22. In general, the illustrative embodiment is depicted and described as configured by separate functional blocks, as described above. It is however to be noted that such a depiction and a description do not restrict the embodiment to an implementation only in the form of hardware but the embodiment may partially or entirely be implemented by software. That may also be the case with illustrative embodiments which will be described below. In this connection, the word "circuit" may be understood not only as hardware, such as an electronics circuit, but also as a function that may be implemented by software installed and executed on a computer.

The jitter buffering controller 22 is, as shown in FIG. 2, implemented by a stored data amount manager 201, a largest sequence number manager 202, a smallest sequence number manager 203, a received-packet sequence number detector 204, a populating controller 205, and a taking-out controller 206.

The stored data amount manager 201 manages the volume of PCM data stored in the data buffer 21. For example, when the data buffer 21 is adapted to store PCM data corresponding to 10 ms as one process unit, the stored data amount manager 201 manages PCM data corresponding to the process unit (10 ms unit) as its stored data amount.

The largest sequence number manager 202 holds the largest sequence number of an IP packet associated with PCM data having its sequence number maximum among the PCM data stored in the data buffer 21.

The smallest sequence number manager 203 holds the smallest sequence number of an IP packet associated with PCM data having its sequence number minimum among the PCM data stored in the data buffer 21.

The received-packet sequence number detector 204 extracts the sequence number from the header information of an IP packet 31 currently inputted from the IP network, and identifies the sequence number of that IP packet.

The populating controller 205 controls the populating operation, namely, storing the PCM data included in an IP packet 21 received from the IP network into the data buffer 21.

The taking-out controller 206 controls the operation for taking out the PCM data stored in the data buffer 21 from the buffer 21. It will be described later on how the populating controller 205 and the taking-out controller 206 operate.

Now, returning to FIG. 1, the PCM decoder 13 is adapted to decode PCM data 33 inputted from the reception jitter buffer 11 to a corresponding linear signal, and sends the linear signal 37 to the packet loss compensator 14. With the illustrative embodiment, the decoder 13 operates as standardized under Recommendation G. 711. However, such a decoding scheme is not restrictive for the PCM decoder 13, and hence that is also the case with encoding scheme.

The packet loss compensator 14 is interconnected to receive the signal 35 representing the occurrence or nonoccurrence of packet loss from the jitter buffer controller 22. The packet loss compensator 14 is operative in response to the signal 35 received representing the nonoccurrence of packet loss to store the linear signal 37 inputted from the PCM decoder 13 therein and to transfer the input signal 37 to the modem signal demodulator 15 over its output 39. The packet loss compensator 14 is also operative in response to the signal 35 representing the occurrence of packet loss to generate a pseudo linear signal on the basis of the past input signal previously received and stored therein to send the pseudo linear signal on its output 39 to the modem signal demodulator 15.

The modem signal demodulator 15 may be a terminal device generally called DCE (Data Circuit-Terminating Equipment). The modem signal demodulator 15 is adapted to receive the linear signal 39 from the packet loss compensator 14 to demodulate it to corresponding digital data, and send the demodulated digital data and control data on its output 41 to the facsimile data reception processor 16.

The facsimile data reception processor 16 may be a device generally called DTE (Data Terminal Equipment). The facsimile data reception processor 16 is adapted for receiving the demodulated digital data and control data 41 from the modem signal demodulator 15, and processing facsimile communication.

In operation, for example, the reception jitter buffer 11 receives an IP packet 31 incoming from an IP network and having its payload of the size of 20 ms. As stated above, with the instant embodiment, the reception jitter buffer 11 performs the populating or taking-out process to or from the data buffer 21 at the intervals of, for example, 10 ms. This means that the data buffer 21 stores and outputs the PCM data corresponding to the unit processing period of 10 ms.

Now, reference will be made to FIG. 3, which lists variables for use in the operation of the reception jitter buffer 11.

Further, FIG. 4 is a schematic diagram useful for understanding how data are stored in the data buffer 21 in the reception jitter buffer 11 and how the jitter buffer controller 22 manages the buffer 11 with those variables.

As seen from FIG. 4, column (A), the data buffer 21 is operative to store units of PCM data each corresponding to the unit processing period of 10 ms, which is represented by a cell 51 in FIG. 4.

In FIG. 4, the data buffer 21 has cells indicated as "empty" representing that the cells are empty, or depleted of data. In the figure, the numerals in each cell represent the sequence number of an IP packet containing the PCM data. For example, the number "13-1" includes numerals "13" representing the sequence number and a numeral "1" representing the sub-number of the sequence number "13". In the instant embodiment, the payload size (20 ms) of IP packets is different from the unit processing period (10 ms) of the data buffer 21. Therefore, the sub-numbers are used for convenience.

The data buffer 21 is basically a FIFO (First-In First-Out)-structured buffer, from which PCM data inputted earlier are developed earlier. However, the data buffer 21 is controlled by the jitter buffer controller 22 so as to store PCM data to be stored into an appropriate storage location.

The jitter buffer controller 22 manages the largest and smallest ones of the sequence numbers associated with the PCM data stored in the data buffer 21. The jitter buffer controller 22 identifies the sequence number of a received packet, and stores the PCM data included in the received packet into a storage location of the data buffer 21 appropriate for the largest and smallest sequence numbers and the sequence number of the received packet thus identified.

For example, in the case of FIG. 4, column (A), the jitter buffer controller 22 is in a state in which the data buffer 21 stores PCM data "11-2", "12-1", "12-2", "13-1", and "13-2". In this case, the jitter buffer controller 22 holds "sn_smallest=11" and "sn_biggest=13" as the smallest and largest sequence numbers, respectively, stored in the data buffer 21.

In that state, when having received an IP packet having its sequence number equal to "15" from the IP network, the jitter buffer controller 22 identifies "sn_RTP=15" as the sequence number of the received packet. In this instance, since the data buffer 21 stores the largest sequence number of "13", an IP packet having its sequence number of "14" should naturally have been inputted. However, for example, packet loss is raised on the IP network so as to cause a packet having its sequence number equal to "15" to have been received, as is the case shown in FIG. 4, column (A).

Under that situation, a conventional reception jitter buffer control basically relying upon a FIFO buffering would have stored the PCM data "15-1" into a location right after (right above in FIG. 4) the PCM data "13-2" and the PCM data "15-2" into a location right after the PCM data "15-1".

However, in the present embodiment, as shown in FIG. 4, column (B), the jitter buffer controller 22 skips the storage locations into which the PCM data "14-1" and "14-2" having the sequence number of "14" would have been stored, and then stores the PCM data "15-1" into a location following the skipped location for PCM data "14-2" and then the PCM data "15-2" into a location right subsequent to the location having stored the PCM data "15-1".

The jitter buffer controller 22 can thus manage the largest and smallest sequence numbers, and identify the sequence number of inputted IP packets to thereby store the PCM data into the appropriate storage locations where the data are to be inherently stored.

In order to describe populating operation to the data buffer 21, reference will be made to FIG. 5, which is a flowchart useful for understanding the operation of populating data into the data buffer 21 under the control of the jitter buffer controller 22. The populating process to the data buffer 21 is mainly controlled by the populating controller 205 of the jitter buffer controller 22.

First, a normal populating process to the data buffer 21 in the reception jitter buffer 11 will be described with reference to FIGS. 5 and 6. FIG. 6 is a schematic diagram useful for understanding the normal populating process to the data buffer 21.

In FIG. 6, column (A), the data buffer 21 stores the PCM data "13-2" to "15-2" while the jitter buffer controller 22 holds the smallest sequence number "sn_smallest=13" and the largest sequence number "sn_biggest=15".

Figure 5:
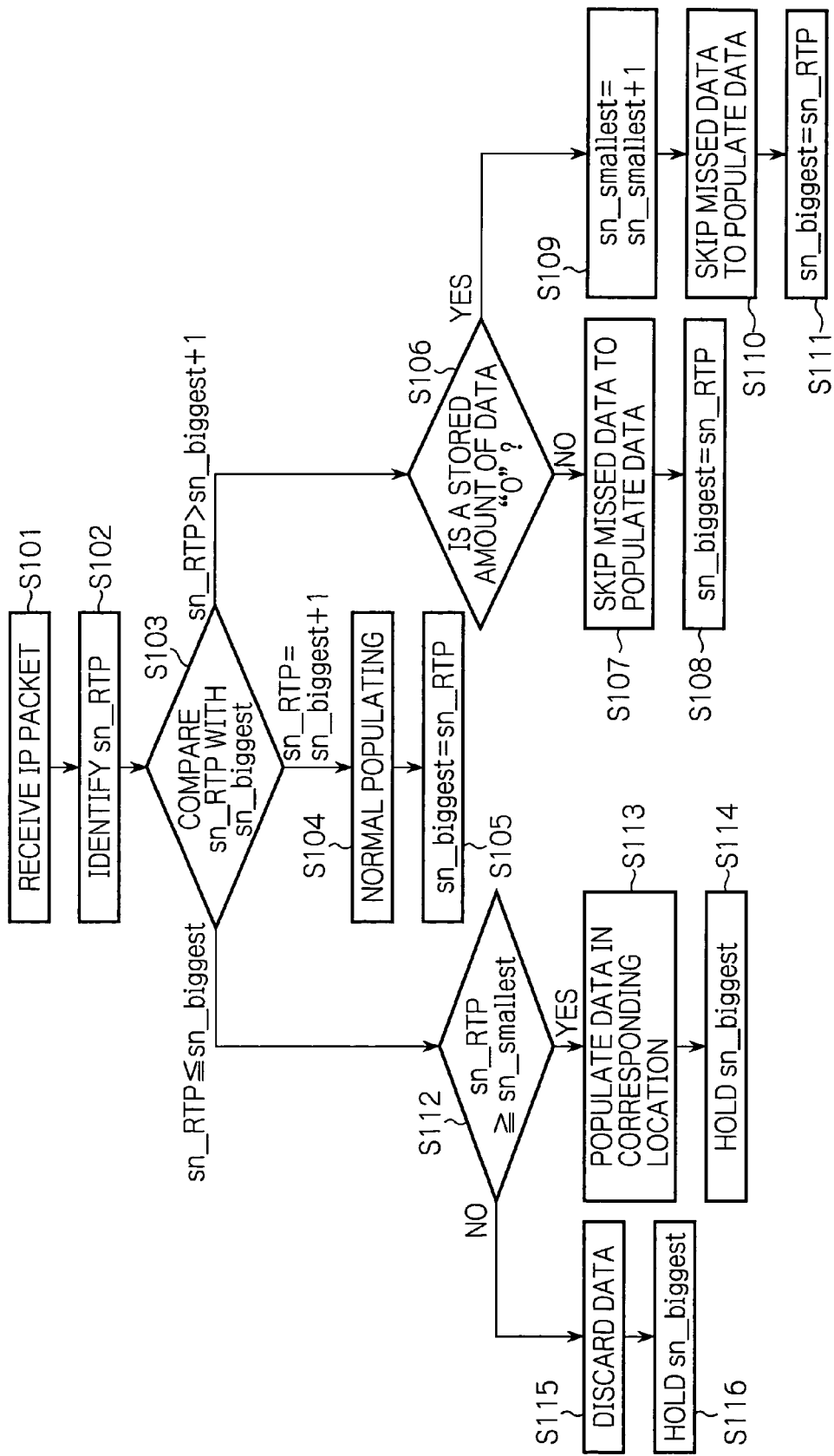
FIG. 5 is a flowchart useful for understanding the operation of populating data into the PCM data buffer shown in FIG. 1.
Figure 6:
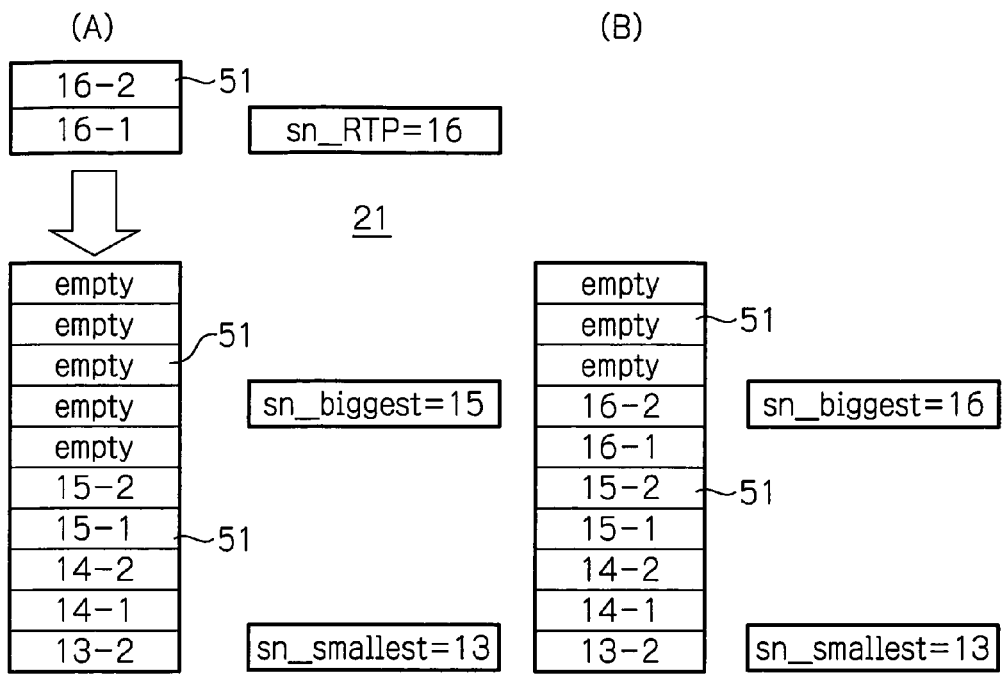
FIG. 6 is a schematic diagram useful for understanding the normal operation of populating data into the PCM data buffer.

In this state, when receiving the IP packet having its sequence number of "16" from the IP network (step S101), the jitter buffer controller 22 identifies the sequence number "sn_RTP=16" of the received packet (step S102, FIG. 5).

In this case, the largest sequence number is "sn_biggest=15", and the sequence number of the IP packet received this time is "sn_RTP=16", which results in "sn_RTP=sn_biggest+1". Thereby, the jitter buffer controller 22 determines that the numbers are sequential (step S103). Therefore, as shown in FIG. 6, column (B), the jitter buffer controller 22 stores the PCM data "16-1" into the storage location after the location where the PCM data "15-2" are stored and the PCM data "16-2" into the storage location after the location where the PCM data "16-1" are stored (step S104).

Additionally, since the PCM data "16-1" and "16-2" are stored, the jitter buffer controller 22 updates the largest sequence number to "sn_biggest=sn_RTP=16" (step S105).

Next, reference will be made to further FIG. 7 to describe the populating process to the data buffer 21 in an exemplified case where packet loss occurs on the IP network so that an IP packet having its sequence number duly expected in sequence does not arrive to cause the sequence number to skip.

Figure 7:
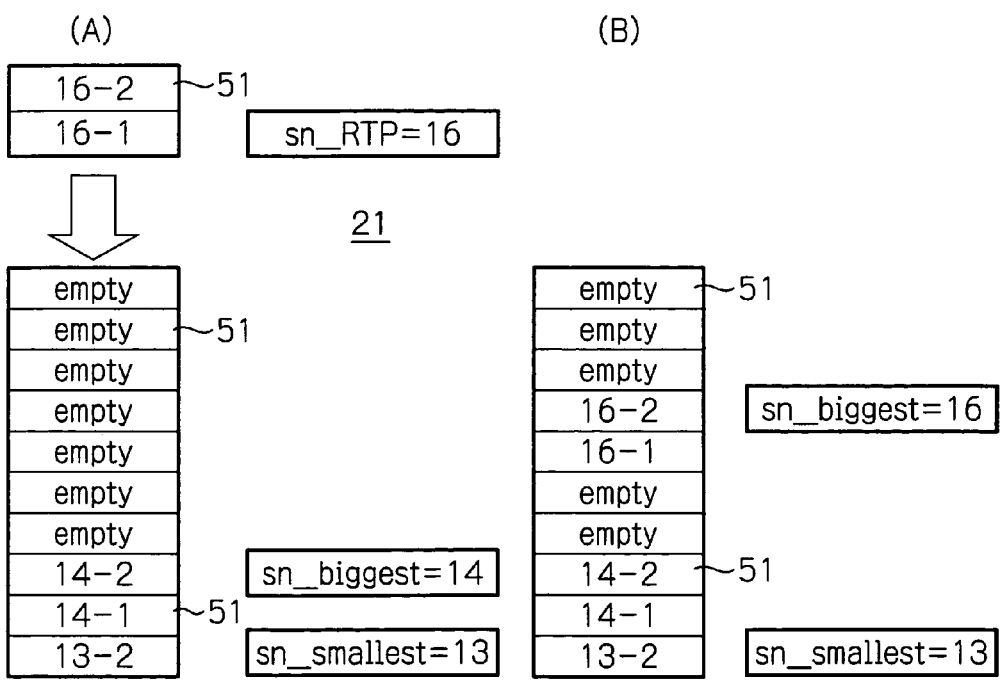
FIG. 7 is a schematic diagram useful for understanding the operation of populating data into the PCM data buffer when the sequence number skips while data are stored.

FIG. 7 is a schematic diagram useful for understanding the populating process to the data buffer 21 in the case of the sequence number skipping. In the figure, column (A), the data buffer 21 stores the PCM data "13-2" to "14-2" while the jitter buffer controller 22 holds the smallest sequence number "sn_smallest=13" and the largest sequence number "sn_biggest=14".

In this state, when receiving an IP packet having its sequence number of "16" from the IP network (step S101), the jitter buffer controller 22 identifies the sequence number "sn_RTP=16" of the received packet (step S102).

In this case, the largest sequence number is "sn_biggest=14", and the sequence number of the IP packet received this time is "sn_RTP=16", which results in "sn_RTP>sn_biggest+1" (step S103). Thereby, the jitter buffer controller 22 determines that the IP packet having its sequence number of "15" is not inputted. In this case, the jitter buffer controller 22 also determines that the stored data amount is not "0", i.e. not empty (step S106).

Therefore, as shown in FIG. 7, column (B), the jitter buffer controller 22 skips the storage locations for the PCM data "15-1" and "15-2" having the sequence number of "15", and stores the PCM data "16-1" having the sequence number of "16" into the storage location subsequent to the location for the PCM data "15-2" and the PCM data "16-2" into the storage location subsequent to the PCM data "16-1" (step S107). Since the PCM data "16-1" and "16-2" are stored, the jitter buffer controller 22 updates the largest sequence number to "sn_biggest=sn_RTP=16" (step S108).

Figure 8:
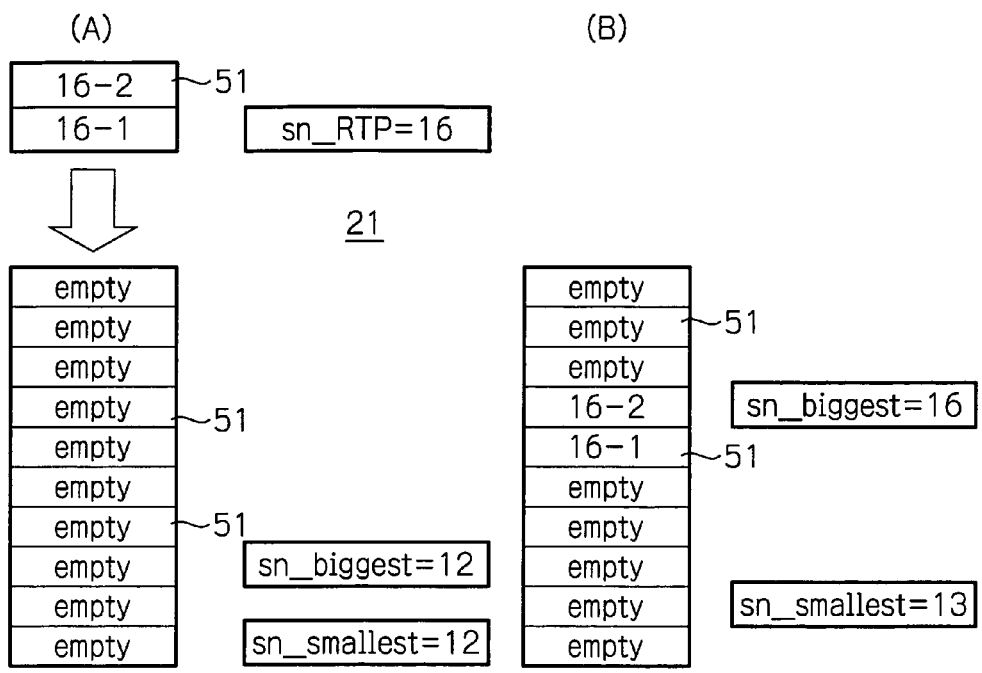
FIG. 8 is a schematic diagram useful for understanding the operation of populating data into the PCM data buffer when the sequence number skips while data are not stored.

Next, reference will be made further to FIG. 8 to describe the populating process in the case where all the PCM data stored in the data buffer 21 are outputted due to, for example, the occurrence of a serious packet loss on the IP network. FIG. 8 is a schematic diagram useful for understanding the populating process to the data buffer 21 when the sequence number skips with the data buffer 21 is empty.

As shown in FIG. 8, column (A), the data buffer 21 stores no PCM data. In this case, the jitter buffer controller 22 holds the sequence number of the PCM data outputted from the data buffer 21 last time as the smallest sequence number "sn_smallest=12". Additionally, the jitter buffer controller 22 holds the sequence number of the PCM data stored in the data buffer 21 last time as the largest sequence number "sn_biggest=12".

In the example shown in FIG. 8, column (A), the jitter buffer controller 22 manages the smallest sequence number as "sn_smallest=12" and the largest sequence number as "sn_biggest=12". In this state, when receiving an IP packet having its sequence number of "16" from the IP network (step S101), the jitter buffer controller 22 identifies the sequence number "sn_RTP=16" of the received packet (step S102).

In this case, the largest sequence number is "sn_biggest=12", and the sequence number of the IP packet received this time is "sn_RTP=16". Thereby, the jitter buffer controller 22 determines "sn_RTP>sn_biggest+1" (step S103). The jitter buffer controller 22 also determines that the stored amount of data is "0" (empty) (step S106), and adds unity to the smallest sequence number "sn_smallest=12" to thereby render the smallest sequence number to "sn_smallest=13" (step S109).

Then, as shown in FIG. 8, column (B), the jitter buffer controller 22 skips the storage locations for the PCM data "16-1" and "16-2" having the sequence number of "16" and stores the PCM data "16-1" having the sequence number of "16" into the storage location after the PCM data "16-2" and the PCM data "16-2" into the storage location after the PCM data "16-1" (step S110). Since the PCM data "16-1" and "16-2" are stored, the jitter buffer controller 22 updates the largest sequence number to "sn_biggest=sn_RTP=16" (step S111).

Figure 9:
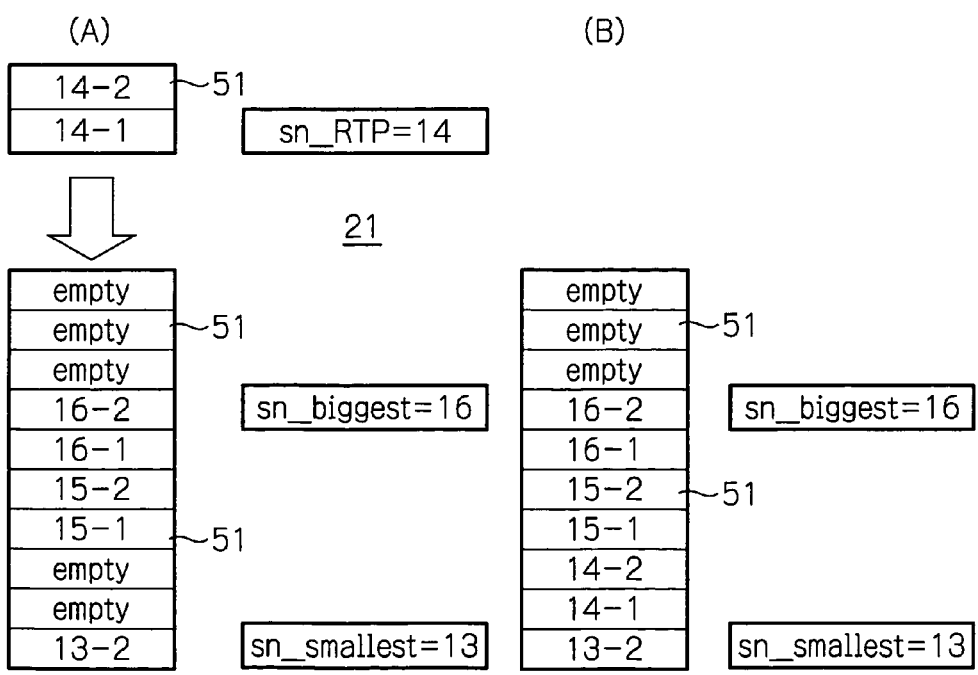
FIG. 9 is a schematic diagram useful for understanding the operation of populating data into the PCM data buffer when the sequence number returns.

Next, reference will be made further to FIG. 9 to describe the populating process in the case where the sequence number returns. FIG. 9 is a schematic diagram useful for understanding the populating operation to the data buffer 21 in the case where the sequence number returns.

In FIG. 9, column (A), the data buffer 21 stores the PCM data "13-2" and "15-" to "16-2" while the jitter buffer controller 22 holds the smallest sequence number "sn_smallest=13" and the largest sequence number "sn_biggest=16". In this state, when receiving an IP packet having its sequence number of "14" from the IP network (step S101), the jitter buffer controller 22 identifies the sequence number "sn_RTP=14" of the received packet (step S102).

In this case, the largest sequence number is "sn_biggest=16", and the sequence number of the IP packet received this time is "sn_RTP=14", which results in "sn_RTP≦sn_biggest" (step S103). Thereby, the jitter buffer controller 22 determines that the IP packet having its sequence number of "14" has arrived after the PCM data having the sequence numbers of "15" and "16" were populated so that the sequence number skips.

Currently, the smallest sequence number is "sn_smallest=13", and the sequence number of the IP packet received this time is "sn_RTP=14". Thus, the jitter buffer controller 22 also determines "sn_RTP≧sn_smallest)" (step S112).

Therefore, as shown in FIG. 9, column (B), the jitter buffer controller 22 stores the PCM data "14-1" and "14-2" having the sequence number of "14" into the corresponding location after the location of the PCM data "13-2" (step S113). In this case, the jitter buffer controller 22 does not update the largest sequence number (step S114).

Figure 10:
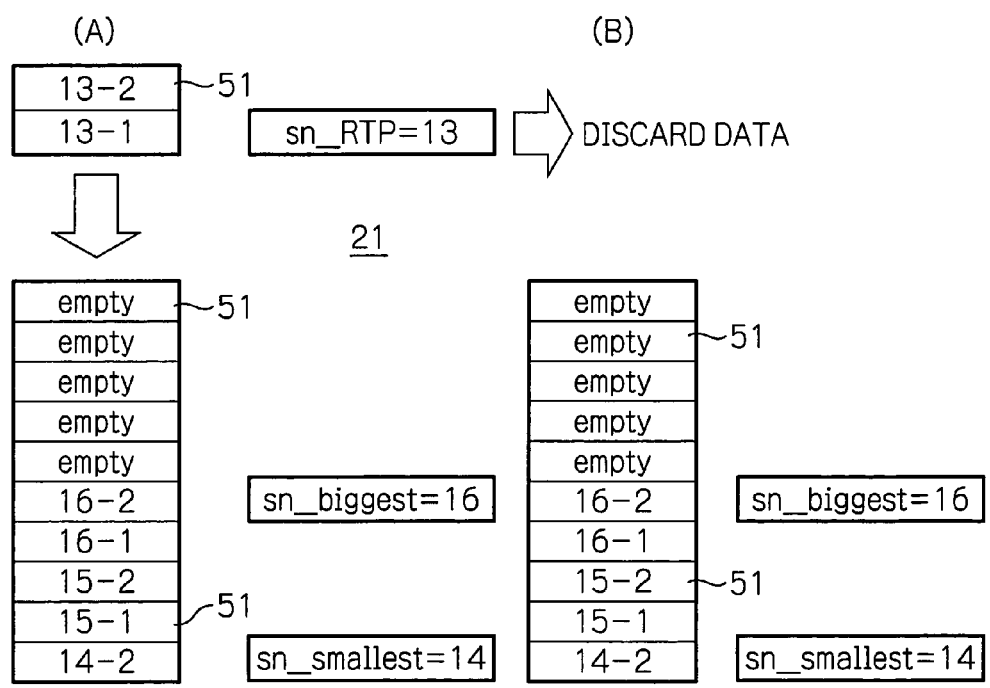
FIG. 10 is a schematic diagram useful for understanding the operation of populating data into the PCM data buffer when the sequence number excessively returns.

Next, reference will be made further to FIG. 10 to describe the populating operation in the case where the sequence number excessively returns. FIG. 10 is a schematic diagram useful for understanding the populating operation to the data buffer 21 in the case where the sequence number excessively returns.

In FIG. 10, column (A), the data buffer 21 stores the PCM data "14-2" to "16-2" while the jitter buffer controller 22 holds the smallest sequence number "sn_smallest=14" and the largest sequence number "sn_biggest=16". In this state, when receiving an IP packet having its sequence number of "13" from the IP network (step S101), the jitter buffer controller 22 identifies the sequence number "sn_RTP=13" of the received packet (step S102).

In this case, the largest sequence number is "sn_biggest=16", and the sequence number of the IP packet received this time is "sn_RTP=13". Thereby, the jitter buffer controller 22 determines "sn_RTP≦sn_biggest" (step S103).

The smallest sequence number is "sn_smallest=14", and the sequence number of the IP packet received this time is "sn_RTP=13". Thereby, the jitter buffer controller 22 also determines that the relation "sn_RTP≧sn_smallest)" is not satisfied (step S112).

In this case, since the IP packet having its sequence number of "13" is excessively delayed in arriving, the jitter buffer controller 22, as shown in FIG. 10, column (B), discards the PCM data "13-1" and "13-2" having the sequence number of "13" (step S115). In this case, of course, the jitter buffer controller 22 does not update the largest sequence number (step S116).

Figure 11:
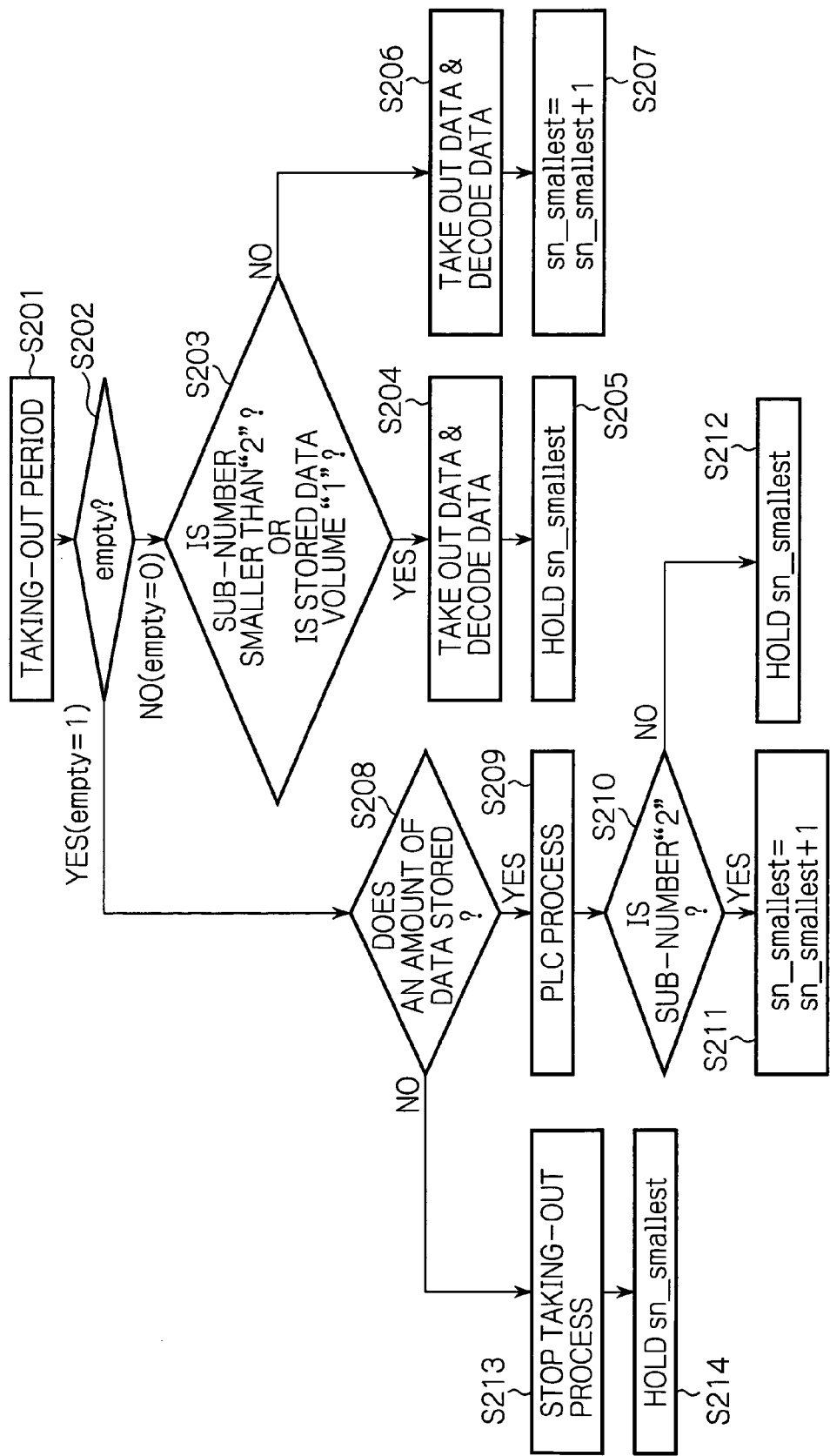
FIG. 11 is a flowchart useful for understanding the operation of taking out data from the PCM data buffer shown in FIG. 1.

Now, data are taken out from the data buffer 21 in the fashion described below with reference to FIG. 11, which is a flowchart useful for understanding a taking-out process from the data buffer 21 by the jitter buffer controller 22. The taking-out process is mainly controlled by the taking-out controller 206 of the jitter buffer controller 22.

Figure 12:
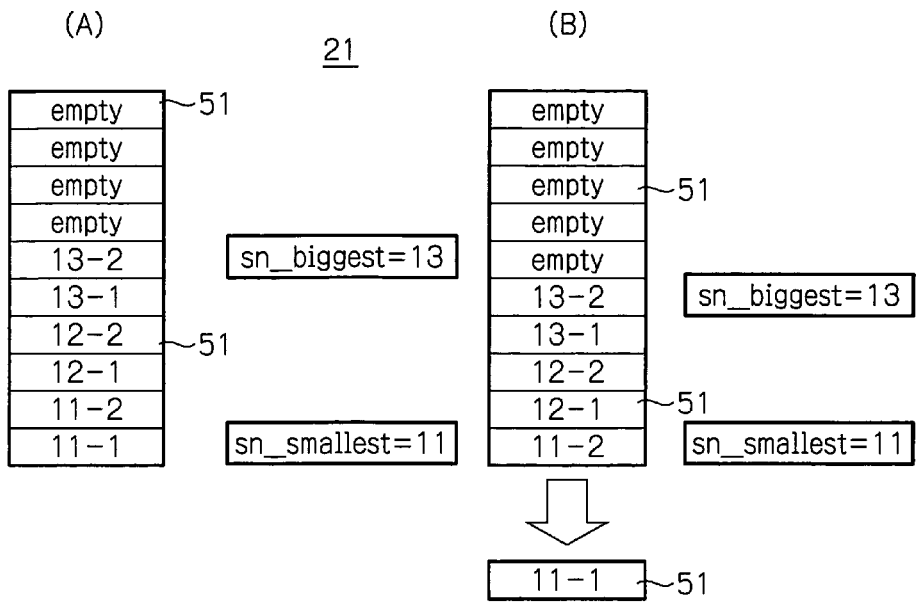
FIG. 12 is a schematic diagram useful for understanding the normal operation of taking out data from the PCM data buffer when data are stored.

First, a normal taking-out operation from the data buffer 21 in the reception jitter buffer 11 will be described with reference to FIGS. 11 and 12. FIG. 12 is a schematic diagram useful for understanding the normal taking-out process from the data buffer 21.

In FIG. 12, column (A), the data buffer 21 stores the PCM data "11-1" to "13-2", while the jitter buffer controller 22 holds the smallest sequence number "sn_smallest=11" and the largest sequence number "sn_biggest=13".

The jitter buffer controller 22 manages the period for taking-out the PCM data from the data buffer 21. At the taking-out time for the PCM data (step S201), the jitter buffer controller 22 outputs the PCM data associated with the smallest sequence number "sn_smallest". In this case, the jitter buffer controller 22 determines both whether or not the PCM data to be taken out from the data buffer 21 are "empty" (step S202) and whether or not "sub-number<2" or "stored data amount=1" (step S203).

In the case shown in FIG. 12, column (A), the PCM data "11-1" are taken out from the data buffer 21, i.e. not "empty", and have the sequence number having its sub-number satisfying the relation "sub-number<2". Therefore, the jitter buffer controller 22, as shown in FIG. 12, column (B), takes out the PCM data "11-1" from the data buffer 21 and sends the PCM data "11-1" to the PCM decoder 13, which will in turn decode the PCM data (step S204). Additionally, the jitter buffer controller 22 holds the preceding value as "sn_smallest" (step S205).

Figure 13:
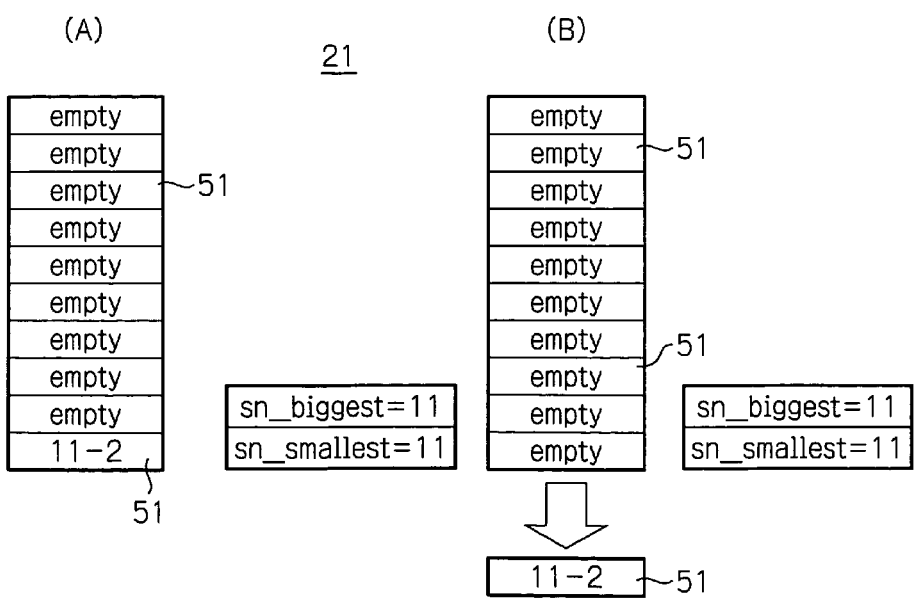
FIG. 13 is a schematic diagram useful for understanding the normal operation of taking out data from the PCM data buffer when being depleted of data.

Next, reference will be made further to FIG. 13 to describe the taking-out operation from the data buffer 21 in the case where the data buffer 21 stores a single piece of the PCM data. FIG. 13 is a schematic diagram useful for understanding the taking-out process from the data buffer 21 in the case where the stored data amount is equal to "1".

In FIG. 1, column (A), in the data buffer 21, PCM data "11-2" are stored. After having taken out the PCM data from the buffer 21, the stored data amount will be equal to "0" (empty). In this case, the jitter buffer controller 22 holds the smallest sequence number "sn_smallest=11" and the largest sequence number "sn_biggest=11".

In FIG. 13, column (A), at the taking-out time for PCM data (step S201), the jitter buffer controller 22 determines whether or not PCM data to be taken out from the data buffer 21 are PCM data "11-2", i.e. not "empty" (step S202) and whether or not "sub-number<2" or "stored data amount=1" (step S203).

In this case, the jitter buffer controller 22, as shown in FIG. 13, column (B), takes out the PCM data "11-2" from the data buffer 21 to send the PCM data "11-2" to the PCM decoder 13, which in turn decodes the PCM data (step S204). After having taken out the PCM data "11-2", the jitter buffer controller 22 holds the smallest sequence number (step S205).

Figure 14:
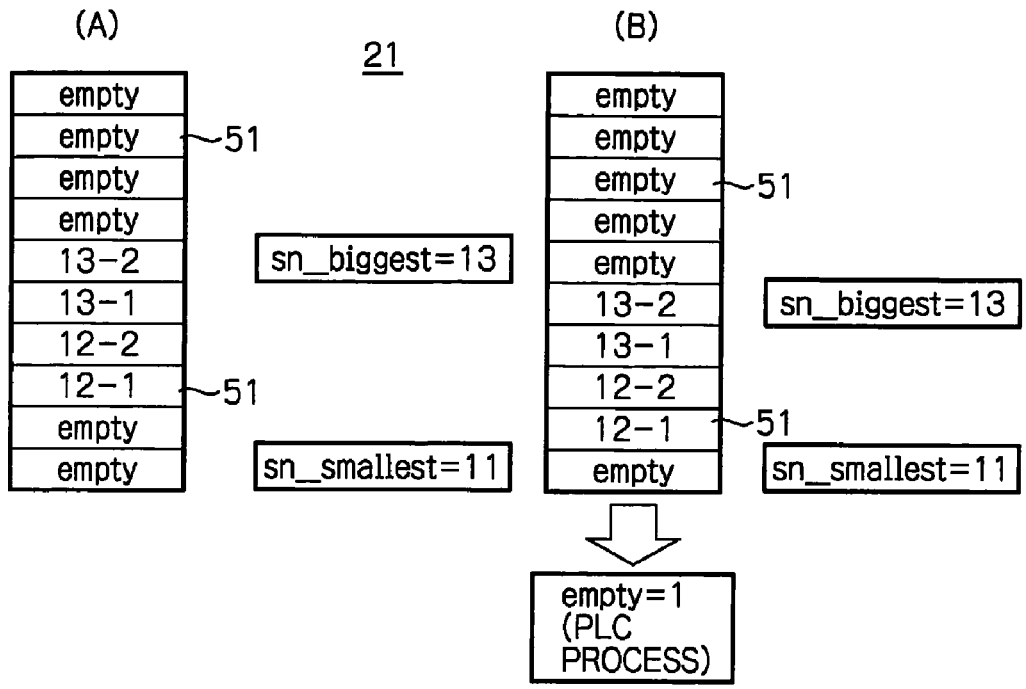
FIG. 14 is a schematic diagram useful for understanding the operation of taking out data from the PCM data buffer in the case of packet loss occurring.

Next, reference will be made further to FIG. 14 to describe the taking-out operation from the data buffer 21 in the case of, for example, packet loss occurring over the IP network. FIG. 14 is a schematic diagram useful for understanding the taking-out process from the data buffer 21 in the case of occurrence of packet loss.

In FIG. 14, column (A), the data buffer 21 does not have the PCM data "11-1" and "11-2" stored but the PCM data "12-1" to "13-2" while the jitter buffer controller 22 holds the smallest sequence number "sn_smallest=11" and the largest sequence number "sn_biggest=13".

In FIG. 14, column (A), at the taking-out time for PCM data (step S201), the jitter buffer controller 22 checks the PCM data to be taken out from the data buffer 21, and thus determines that the PCM data associated with the smallest sequence number "sn_smallest=11" are not stored, i.e. "empty" (step S202).

In turn, the jitter buffer controller 22 determines whether or not a volume of data are stored in the data buffer 21 (step S208). In this case, since the data buffer 21 stores the PCM data "12-1" to "13-2", the jitter buffer controller 22 determines that the amount of data are stored.

The jitter buffer controller 22 sends a signal representing the occurrence of packet loss to the packet loss compensator 14, which will in turn process packet loss compensation during this processing period (step S209). Thereby, during this processing period, the packet loss compensator 14 will form a pseudo linear signal, but can prevent the extension and contraction of time from being caused. Therefore, in this processing period, a reception error in a modem signal could be caused. However, after this processing period, the demodulation will be able to proceed normally.

Meanwhile, in the instant embodiment, the packet loss compensation is processed in the step 209. However, the packet loss compensation may not necessarily be processed.

The jitter buffer controller 22 checks the sub-number in the sequence number of PCM data, and updates, when taking out all the PCM data having the same sequence number, the smallest sequence number by incrementing to "sn_smallest=sn_smallest+1" (step S211).

In this case, the jitter buffer controller 22 may determine, if necessary, whether or not "sub-number=2" (step S210), and sets the smallest sequence number to "sn_smallest=sn_smallest+1" when the sub-number is equal to 2 (step S211), and otherwise maintains the preceding value "sn_smallest" (step S212).

Next, reference will be made further to FIG. 15 to describe the taking-out operation in the case of occurrence of the under-running in the reception jitter buffer 11.

Figure 15:
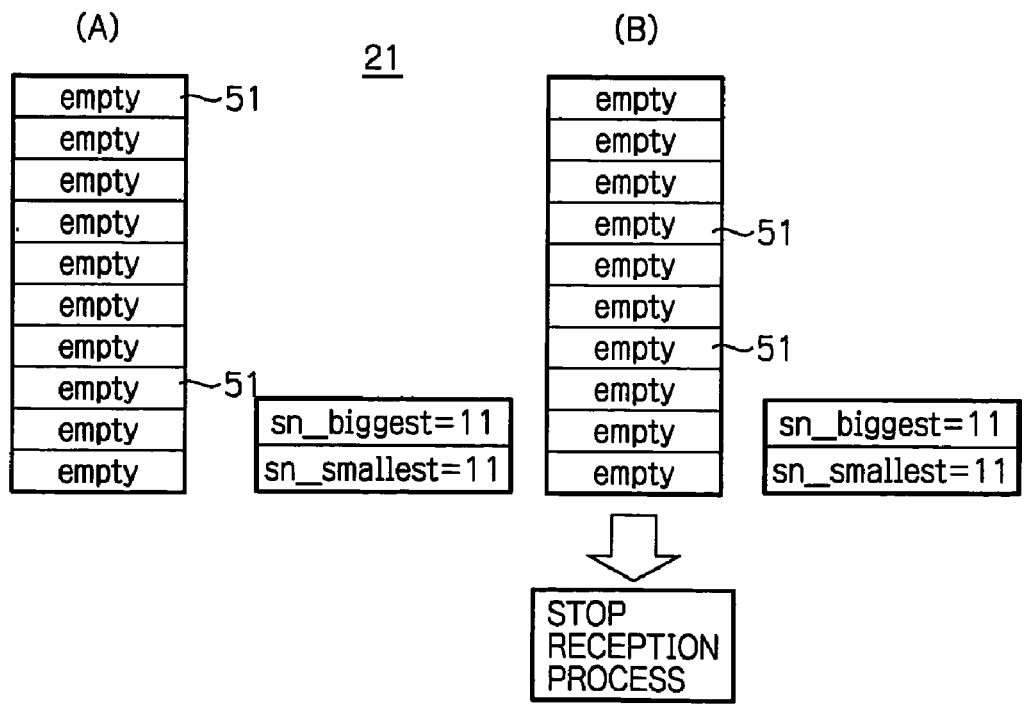
FIG. 15 is a schematic diagram useful for understanding the operation of taking out data from the PCM data buffer in the case of under-running.

FIG. 15 is a diagram useful for understanding the taking-out process from the data buffer 21 in the case of under-running in the reception jitter buffer 11. In FIG. 15, column (A), the data buffer 21 does not have the PCM data stored while the jitter buffer controller 22 holds the smallest sequence number "sn_smallest=11" and the largest sequence number "sn_biggest=11".

In FIG. 15, column (A), at the taking-out time for PCM data (step S201), the jitter buffer controller 22 checks the PCM data to be taken out from the data buffer 21 to determine that the PCM data associated with the smallest sequence number "sn_smallest=11" are not stored, i.e. "empty" (step S202).

In turn, the jitter buffer controller 22 determines whether or not a volume of data are stored in the data buffer 21 (step S208). In this case, since the data buffer 21 does not have the PCM data stored, the jitter buffer controller 22 determines that an amount of data are not stored.

In this case, the jitter buffer controller 22 stops the taking-out process (step S213), and keeps holding the smallest sequence number (step S214).

In summary, in accordance with the instant illustrative embodiment, even when a difference in period between the transmitter and receiver sides or fluctuation over an IP network causes the under-running in the reception jitter buffer, the operation following the output of the reception jitter buffer is rendered ceased, which can avoid a pseudo linear signal from being inserted in the middle of a modem signal. Therefore, the under-running in the reception jitter buffer would not cause a reception error in the modem signal.

Additionally, in accordance with the present embodiment, it is not necessary to introduce an initial delay into the reception jitter buffer at the start of facsimile communication. Thereby, failure of facsimile transmission caused by a transmission delay can be decreased.

Furthermore, in accordance with the instant embodiment, when packet loss occurs, only the part in which the packet loss occurs is replaced with a pseudo linear signal, which does not cause the extension or contraction of time of the modem signal. As a result, the modem signal except the part in which the packet loss is involved will normally be received with reception error minimized.

With the illustrative embodiment described above, the jitter buffer controller 2, FIG. 1, is adapted to take out data from the PCM storage buffer once at each processing time interval, which is exemplified as 10 ms. However, the jitter buffer controller 22 may alternatively be adapted to determine how much PCM data are stored in the data buffer 21 when taking out the PCM data at the start of each processing time interval. Then, when the jitter buffer controller 22 determines that the data buffer 21 contains a volume of data not less than a threshold value at the beginning of a processing time interval, the controller 22 will takes out the PCT data from the buffer 21 twice or more during that processing time interval. Namely, during one processing period, the PCM data may be taken out which correspond to two or more processing periods from the data buffer 21.

For example, the threshold value for determining a volume of data stored in the data buffer 21 is set to "2", corresponding to 20 ms. The jitter buffer controller 22, of course, tries to take out PCM data from the buffer 21 at each predetermined processing interval, e.g. 10 ms.

At the time of the processing period commencing, in order to take out PCM data from the data buffer 21, the jitter buffer controller 22 determines whether or not the volume of data stored in the data buffer 21 is not less than the threshold value of "2". When the volume of data stored in the data buffer 21 is not less than the threshold value of "2", the jitter buffer controller 22 will proceed to taking out the PCM data corresponding to two processing periods during that single processing period. Thus, even under the situation where a delay amount in the reception jitter buffer 11 increases with time elapsing, an increased amount of PCM data can be outputted from the buffer 21 at each processing time interval, thereby preventing the delay from accumulating.

In accordance with the illustrative embodiment described above, the facsimile communication device 1 may be mounted on an information processing system such as a personal computer. In such an application, parallel processing may be available, so that PCM data corresponding to two or more processing periods are outputted during one processing period to thereby allow modem signals to be demodulated in parallel processing.

By contrast, when the jitter buffer controller 22 determines that the data buffer 21 stores a volume of data less than the threshold value of "2", the jitter buffer controller 22 takes out the PCM data corresponding to that one processing period at a time.

In short, the jitter buffer controller 22 thus operating may allow an increased volume of data to be developed from the data buffer 21 for each processing time interval, so that a demodulation delay can be prevented from increasing which would otherwise be caused by an increased volume of data stored in the reception jitter buffer 21. As a result, failure of facsimile communication that would be caused by such a transmission delay can be decreased.

The present invention can also be applied to reception jitter buffering control for modem data communications other than the facsimile communications exemplified.

Additionally, not being restricted to facsimile signals, the present invention can also be applied to jitter buffering control for audio communication signals. For example, the invention may be applied to jitter buffering control for use in an audio recording apparatus for recording a received audio signal, which may partially be skipped in a period of buffering control though, but can continue recording.

Further, the illustrative embodiment deals with facsimile signals and control signals received. However, the present invention can also be applied to a re-transmission system in which signals are re-transmitted when an error occurs over a telecommunications network, such as ECM (Error Correction Mode) system.

The entire disclosure of Japanese patent application No. 2009-73770 filed on Mar. 25, 2009, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A jitter buffer control apparatus comprising:
   a buffer having a plurality of storage locations for storing input data included in input packets received from a telecommunications network, the input packets having sequence numbers allotted thereto; and
   a jitter buffer controller for controlling said buffer at a sequence of processing time intervals defining processing periods of a predetermined length to store the input data into said buffer and for taking out the stored input data from said buffer based on the sequence numbers,
   wherein said jitter buffer controller is responsive to under-running occurring in said buffer to store the input data into said buffer with at least one of the storage locations being skipped, the at least one storage location that is skipped corresponding to one or more processing periods associated with packet loss occurring due to the under-running,
   wherein said jitter buffer controller manages the storage locations so as to store the input data into the storage locations in order of the sequence numbers, thereby storing the input data into storage locations which are associated with the sequence numbers of the input packets including the input data, and
   wherein said jitter buffer controller takes out the input data from said buffer in the order in which the input data are stored,
   wherein said jitter buffer controller refrains, when no input data are stored in one of the storage locations associated with one of the processing periods, from outputting data during said one of the processing periods,
   wherein said jitter buffer controller determines whether or not said buffer contains an amount of stored input data which exceeds a threshold value for the processing period,
   wherein said jitter buffer controller outputs, when said jitter buffer controller determines that the amount of the input data stored in said buffer exceeds the threshold value for the processing period, input data corresponding to two or more processing periods.

2. The apparatus in accordance with claim 1, wherein said jitter buffer controller comprises:
   a stored data amount manager for managing the amount of the input data stored in said buffer;
   an input sequence number detector for identifying the sequence numbers of the input packets;
   a smallest sequence number manager for managing smallest one of the sequence numbers of the input data stored in said buffer;
   a largest sequence number manager for managing largest one of the sequence numbers of the input data stored in said buffer;
   a populating controller for comparing, when storing the input data into said buffer, the sequence numbers of the input data with the largest and smallest sequence numbers to store the input data into the storage locations associated with the input sequence numbers; and
   a taking-out controller for determining, when taking out the stored input data from said buffer, how said buffer stores in the storage locations the input data to be processed in the processing period, and the smallest sequence number, and the amount of the stored input data to output the stored input data from said buffer.

3. A method for controlling jitter buffering in a jitter buffer control apparatus including a buffer having a plurality of storage locations for storing input data included in input packets received from a telecommunications network and a jitter buffer controller, the input packets having sequence numbers allotted thereto, said method comprising:

using the jitter buffer controller to control the buffer at a sequence of processing time intervals defining a processing period of a predetermined length to store the input data into the buffer and take out the stored input data from the buffer based on the sequence numbers, wherein the jitter buffer controller is responsive to under-running occurring in the buffer to store the input data into the buffer with at least one of the storage locations being skipped, the at least one of the storage locations that is skipped corresponding to one or more processing periods associated with packet loss occurring due to the under-running, wherein said jitter buffer controller manages the storage locations so as to store the input data into the storage locations in order of the sequence numbers, thereby storing the input data into storage locations which are associated with the sequence numbers of the input packets including the input data, and wherein said jitter buffer controller takes out the input data from said buffer in the order in which the input data are stored, wherein said jitter buffer controller refrains, when no input data are stored in one of the storage locations associated with one of the processing periods, from outputting data during said one of the processing periods, wherein said jitter buffer controller determines whether or not said buffer contains an amount of stored input data which exceeds a threshold value for the processing period, wherein said jitter buffer controller outputs, when said jitter buffer controller determines that the amount of the input data stored in said buffer exceeds the threshold value for the processing period, input data corresponding to two or more processing periods.

4. A non-transitory computer-readable medium that stores a program for use in a jitter buffer control apparatus including a buffer having a plurality of storage locations for storing input data included in input packets received from a telecommunications network, the input packets having sequence numbers allotted thereto, wherein said program causes, when installed and running on a computer, the computer to function as a jitter buffer controller for controlling the buffer at a sequence of processing time intervals defining processing periods of a predetermined length to store the input data into the buffer and take out the stored input data from the buffer based on the sequence numbers, and the jitter buffer controller is responsive to under-running occurring in the buffer to store the input data into the buffer with at least one of the storage locations skipped, the at least one of the storage locations that is skipped corresponding to one or more processing periods associated with packet loss occurring due to the under-running, wherein said jitter buffer controller manages the storage locations so as to store the input data into the storage locations in order of the sequence numbers, thereby storing the input data into storage locations which are associated with the sequence numbers of the input packets including the input data, and wherein said jitter buffer controller takes out the input data from said buffer in the order in which the input data are stored, wherein said jitter buffer controller refrains, when no input data are stored in one of the storage locations associated with one of the processing periods, from outputting data during said one of the processing periods, wherein said jitter buffer controller determines whether or not said buffer contains an amount of stored input data which exceeds a threshold value for the processing period, wherein said jitter buffer controller outputs, when said jitter buffer controller determines that the amount of the input data stored in said buffer exceeds the threshold value for the processing period, input data corresponding to two or more processing periods.

5. An information processing system including a jitter buffer control apparatus comprising:

a buffer having a plurality of storage locations for storing input data included in input packets received from a telecommunications network, the input packets having sequence numbers allotted thereto; and a jitter buffer controller for controlling said buffer at a sequence of processing time intervals defining processing periods of a predetermined length to store the input data into said buffer and take out the stored input data from said buffer based on the sequence numbers, wherein said jitter buffer controller is responsive to under-running occurring in said buffer to store the input data into said buffer with at least one of the storage locations being skipped, at least one of the storage locations that is skipped corresponding to one or more processing periods associated with packet loss occurring due to the under-running, wherein said jitter buffer controller manages the storage locations so as to store the input data into the storage locations in order of the sequence numbers, thereby storing the input data into storage locations which are associated with the sequence numbers of the input packets including the input data, and wherein said jitter buffer controller takes out the input data from said buffer in the order in which the input data are stored, wherein said jitter buffer controller refrains, when no input data are stored in one of the storage locations associated with one of the processing periods, from outputting data during said one of the processing periods, wherein said jitter buffer controller determines whether or not said buffer contains an amount of stored input data which exceeds a threshold value for the processing period, wherein said jitter buffer controller outputs, when said jitter buffer controller determines that the amount of the input data stored in said buffer exceeds the threshold value for the processing period, input data corresponding to two or more processing periods.

* * * * *